B. HOLT.
ENDLESS CHAIN TRACK FOR TRACTORS.
APPLICATION FILED JULY 17, 1917.

1,258,612.

Patented Mar. 5, 1918.

WITNESSES:
Charles Bokeles
Julius C. Bencach.

INVENTOR
Benjamin Holt
BY Strong & Townsend,
ATTORNEYS

UNITED STATES PATENT OFFICE.

BENJAMIN HOLT, OF STOCKTON, CALIFORNIA.

ENDLESS-CHAIN TRACK FOR TRACTORS.

1,258,612. Specification of Letters Patent. Patented Mar. 5, 1918.

Application filed July 17, 1917. Serial No. 181,103.

*To all whom it may concern:*

Be it known that I, BENJAMIN HOLT, a citizen of the United States, residing at Stockton, in the county of San Joaquin and State of California, have invented new and useful Improvements in Endless-Chain Tracks for Tractors, of which the following is a specification.

This invention relates to endless chain tracks such as are used in tractors of the self-laying track type.

In a prior application, namely, Serial Number 165,338, filed April 30th, 1917, I show and describe pads or cushions carried by the drive and idler wheels of the tractor truck mechanism to engage with the chain track for the purpose of absorbing the shocks and eliminating the noise.

In the present case I arrange such pads or cushions on the links of the chain and secure the same results, while permitting plain wheels of the usual type to be employed. Ordinarily the links straddle the rim of the wheel and have pin teeth contacting with the periphery thereof which, in operation, strike with considerable force causing shocks and noise and resulting in a quick wearing of the parts. By arranging pads or cushions on each link so that they engage the periphery of the wheels and maintaining the pin teeth out of substantial contact therewith the noise and shocks are eliminated and the wear falls upon easily and cheaply replaceable parts. The pads may be of fiber, rubber, or other suitable yielding and non-metallic material.

One form which my invention may assume is exemplified in the following description and illustrated in the accompanying drawings, in which—

Figures 1, 2:
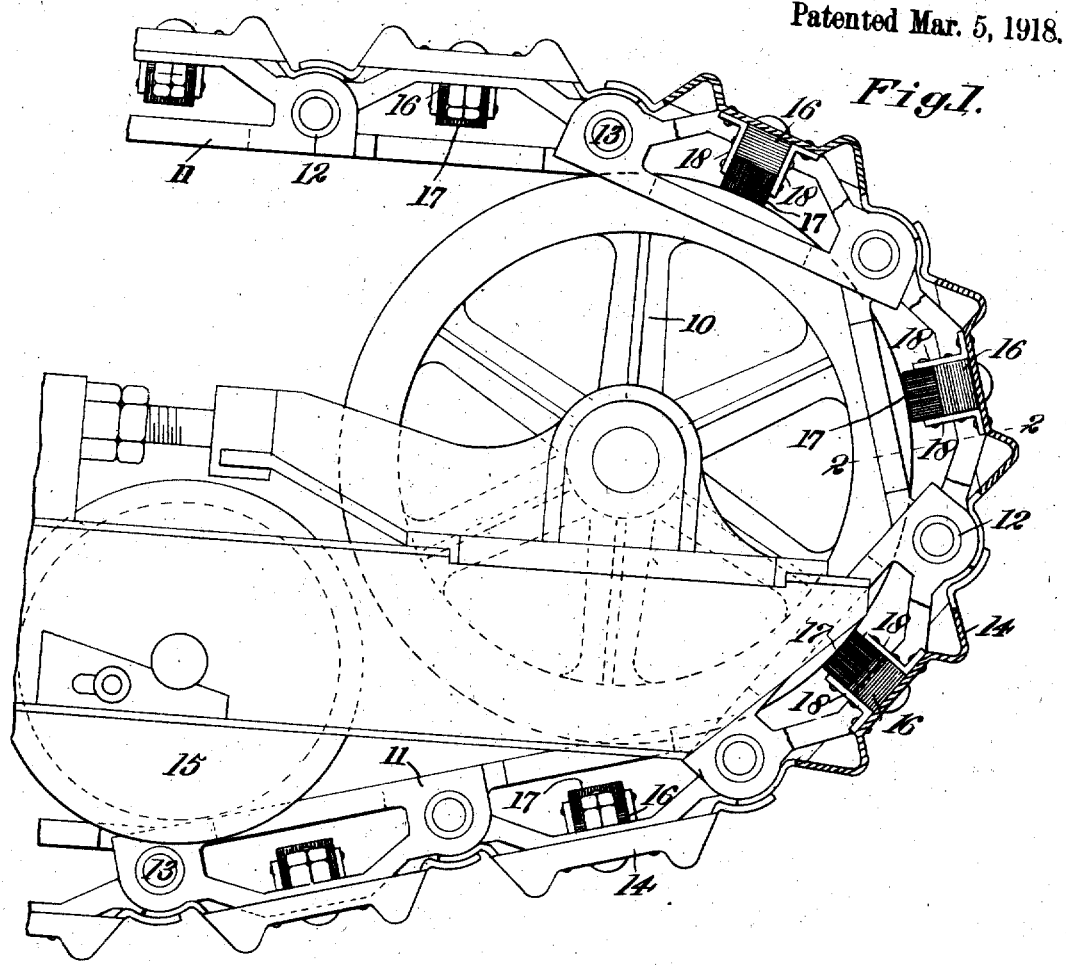
Figure 1 shows a side elevation, partly in section, of one end of a tractor truck mechanism having a chain track equipped with pads or cushions in accordance with my invention.
Fig. 2 shows a sectional view, taken on the line 2—2 of Fig. 1.

I show a blank rim idler or guide wheel 10 over which runs an endless chain track made up of a series of articulated link sections, each section comprising spaced side plates 11 connected together at one end by a sleeve or gudgeon block 12 cored to receive a journal pin 13 for connecting adjacent links together. Each pair of side plates carries a shoe or base member 14, either integral or disconnectible therewith. The sleeves or gudgeon blocks 12 constitute pin teeth to engage with the sprocket teeth on the drive wheel, not shown. The side bars 11 form rails on their inner longitudinal edges for supporting a series of rollers 15, the latter being connected to the tractor or vehicle frame and supporting the entire weight of the same. The side bars 11 straddle the rims of the driving and guide wheels in operation.

In the middle portion of each link on the base or shoe 14 I arrange a block 16, preferably of wood, and upon it another block 17, preferably of rubber, and connect the two together and fasten them to the shoe by means of angle plates 18 riveted in place thereon. The rubber blocks are high enough to engage with the rim of the wheel to keep the pin teeth from forcibly striking the same. These blocks, therefore, receive the burden of the wear and act to cushion the links and render the operation of the tractor noiseless. They are quickly and easily replaceable when worn. By arranging them on the center or middle portion of each link and having them of the size shown, they will fit between the teeth of the sprocket driving wheel in passing around the latter.

Various changes in the construction and arrangement of the several parts herein shown and described may be employed without departing from the spirit of my invention as disclosed in the appended claims.

Having thus described my invention, what I claim and desire to secure by Letters Patent is—

1. In a tractor truck mechanism, an endless chain track made up of a series of articulated link sections, a wheel over which said track operates, said wheel having its rim straddled by the side bars of the link sections, pin teeth on said links, and pads of yielding and non-metallic material carried by each link near the center thereof engaging the rim of the wheel and maintaining the pin teeth out of forcible contact therewith.

2. In a tractor truck mechanism, an endless chain track made up of a series of articulated link sections, a wheel over which said track operates, said wheel having its rim straddled by the side bars of the link sections, pin teeth on said links, a shoe on each link, and a pad of yielding and non-metallic material detachably connected to said shoe near the center thereof and extending between the side bars for engagement with the rim of the wheel to maintain the pin teeth out of forcible contact with said rim.

3. In a tractor truck mechanism, an endless chain track made up of a series of articulated link sections, a wheel over which said track operates, said wheel having its rim straddled by the side bars of the link sections, pin teeth on said links, a shoe on each link, and a pad of yielding and non-metallic material detachably connected to said shoe near the center thereof and extending between the side bars for engagement with the rim of the wheel to maintain the pin teeth out of forcible contact with said rim, said pad comprising a block of wood resting on the shoe and a block of rubber overlying the same.

4. In a tractor truck mechanism, an endless chain track made up of a series of articulated link sections, a wheel over which said track operates, said wheel having its rim straddled by the side bars of the link sections, pin teeth on said links, a shoe on each link, a pad of yielding and non-metallic material detachably connected to said shoe near the center thereof and extending between the side bars for engagement with the rim of the wheel to maintain the pin teeth out of forcible contact with said rim, said pad comprising a block of wood resting on the shoe and a block of rubber overlying the same, and angle plates for connecting said blocks together and fastening the same to the shoe.

5. An endless chain track for tractors made up of a series of articulated link sections, each section comprising spaced side bars formed with interconnecting pin teeth at their ends, a shoe carried by each link, and a pad of yielding, non-metallic material on each shoe between the side bars centrally thereof, substantially as and for the purposes stated.

In testimony whereof I have hereunto set my hand in the presence of two subscribing witnesses.

BENJAMIN HOLT.

Witnesses:
- OLIVER H. EULESTER,
  CHARLES L. NEUMITTER.